(12) United States Patent
Springer

(10) Patent No.: X2413
(45) Date of Patent: Dec. 27, 1815

(54) SAW MILL , WIND

(76) Inventor: Jesse Springer

Jesse Springer.
Letters Patent dated 27th Dec 1815 & Recorded [illegible] January
25th 1851

The Schedule referred to in these Letters Patent and making part of
the same containing a description in the words of the said Jesse Springer
himself of his Round Saw mill The Machinery of this saw mill consists
of the following described parts, which are fixed within a wooden frame
or building of suitable dimensions weather boarded and shingled. the
frame & outward casing may be made either of an Octagon form
a Hexagon, Pentagon or any other that may be found suitable
across the interior of the (Building) towards the top is fixed
a horizontal shaft turning on gudgeons in cross pieces at
each end, these gudgeons extend outward and form a crank
that operates on a Pitman which causes the motion of the
saw there is one of said cranks at each end of the shaft
which causes the operation of two saws in opposite directions
Near one end of the shaft is a Trunnel head and
on the opposite side of the shaft near the end is fixed a
balance wheel of suitable size Just over the said shaft is framed
a horizontal beam directly at right angles with the [illegible]
and the ends are framed in the uprights of the building
In the centre of said beam which is immediately over the centre
of the shaft is fixed a gudgeon in which turns the upper point of
a perpendicular shaft called the centre shaft the pivot on the upper
part of this shaft turns in a cross beam fixed across the centre of
the revolving top frame.
Near the lower end of the said shaft is fixed a horizontal cogwheel
the cogs of which mash into the rounds of the trunnel head. Over this
cogwheel which is fixed on the same shaft, a horizontal trunnel
head the rounds of which mesh into the cogs of the [illegible] main
cogwheel which is fixed on a horizontal shaft across the top.

of the top frame; the said shaft projects out from the building as in other mills, & receives at the arms and sails which are operated on by the wind; and give motion to the machinery. At the bottom of the frame or building under the cranks before mentioned are [illegible] the Saw gates which receive through them the logs to be sawed )

A Perpendicular shaft is suspended from the centre cog wheel above to the Rag wheel that moves the carriage that carries the back after the Calf is sawed)

Witnesses
Geo. Lyon
Geo. Hadfield

Jesse Springer 600 wds

Exd. W.T.B.